United States Patent Office 3,509,728
Patented May 5, 1970

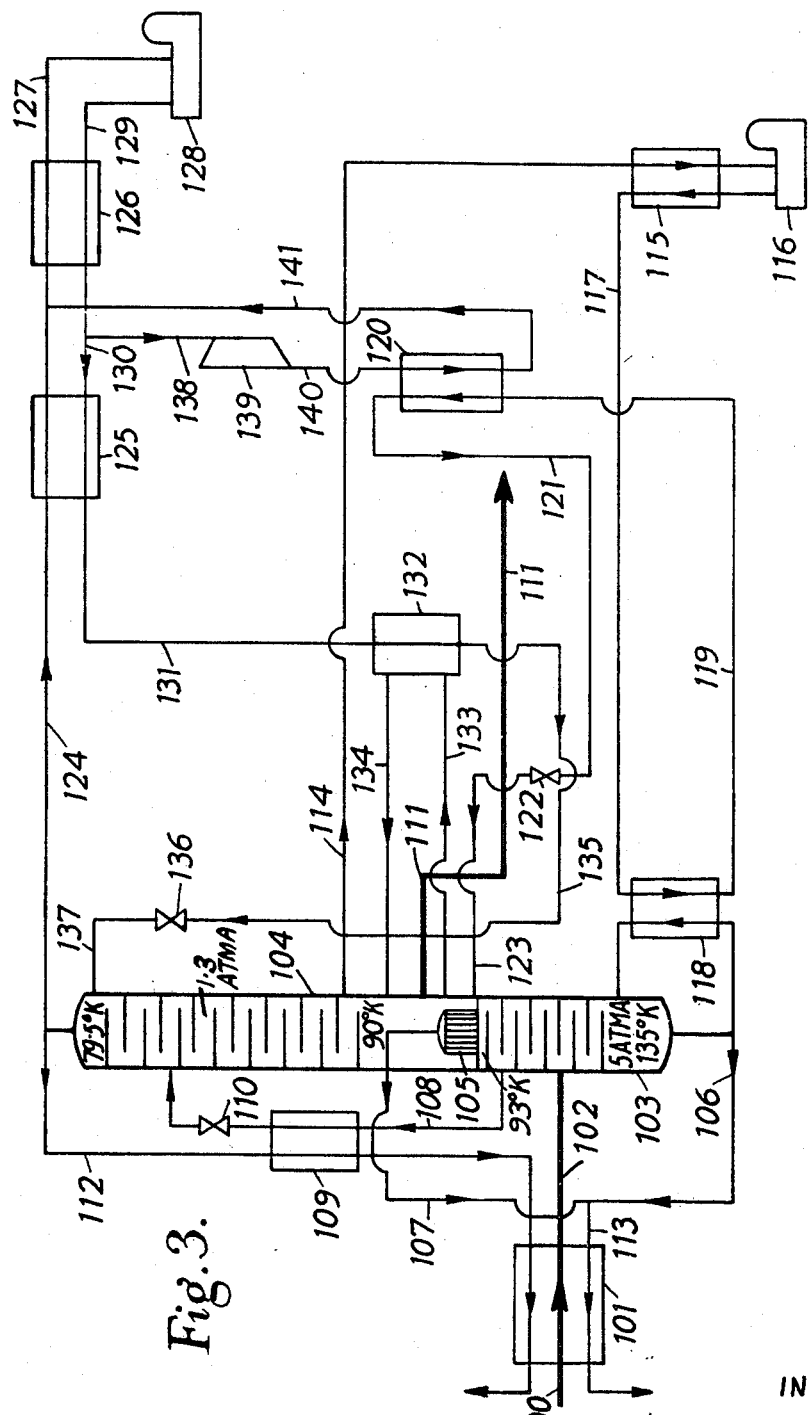

3,509,728
LOW TEMPERATURE SEPARATION OF GASES UTILIZING TWO DISTILLATION COLUMNS HAVING A COMMON CONDENSER-EVAPORATOR
Stanley Mercer, Chorlton-cum-Hardy, Manchester, Alan Alfred Haslam, Hazel Grove, Stockport, and Paul L. Charlesworth, Birchencliffe, Huddersfield, England, assignors to Petrocarbon Developments Limited, London, England
Filed Feb. 20, 1967, Ser. No. 617,367
Claims priority, application Great Britain, Feb. 22, 1966, 7,708/66
Int. Cl. F25j 1/02, 3/02
U.S. Cl. 62—28     5 Claims

ABSTRACT OF THE DISCLOSURE

A system for the fractionation at low temperatures of a mixture of three or more gases to produce three or more product streams, which system essentially comprises two distillation columns, each having its own heat pump cycle providing reboil and reflux therefor and the distillation columns having a common condenser/evaporator providing reflux for the first column into which the feed mixture is introduced and reboil for the second column. The heat pump cycles may be closed cycles using external refrigerants or open cycles using as refrigerants components separated in the system. Refrigeration for the operation of the process may be produced by expansion of a gas stream of the system at an elevated pressure through an expansion turbine with performance of external work.

---

This invention relates to the separation of gases by fractionation at low temperatures.

The separation of a gaseous mixture of three or more components into three or more different product streams by fractional distillation normally requires at least two distillation columns, and it is with separations of this kind utilizing two distillation columns that the invention is particularly concerned. The "product streams" referred to are not necessarily all for recovery of product but may include waste product streams.

It is known to provide reboil and reflux for a distillation column operating below ambient temperatures by means of a heat pump. In this arrangement, a refrigerant vapour is compressed to a suitable pressure in a compressor, is then condensed in the reboiler of the distillation column (supplying heat thereto), is subsequently expanded to a lower pressure and evaporated in the reflux condenser of the column (absorbing heat therefrom) and is finally returned to the compressor for recompression and recirculation.

Though this method of providing reboil and reflux is in many cases suitable for a single column, it is an inflexible method in that it is not possible to vary the reflux and reboil independently of each other. In particular, difficulties would be experienced when operating with two or more columns if each were provided with its own heat pump cycle in that the columns cannot be operated efficiently as the proper heat balance cannot be provided for each column.

We have now found that highly satisfactory results can be obtained by using two distillation columns each provided with its own heat pump cycle, if the two columns are operated with a common condensor/evaporator which simultaneously provides reflux for the one column and reboil for the other column. By operating in this fashion the two columns are thermally linked together in such manner that it is possible to ensure the heat balance of the two columns in combination as well as of each column separately, by suitable choice of the temperature, state, and hence enthalpy, of the feed in the first column.

Thus in accordance with the invention a method for the separation by fractionation at low temperatures of a mixture of three or more gases to produce three or more product streams utilizing two distillation columns is characterised in that reboil and reflux for each column is provided by a heat pump cycle, a separate heat pump cycle being used for each column, and in that additionally the columns are thermally linked together by a common condenser evaporator providing reflux for the first column into which the feed mixture is introduced and reboil for the second column.

The invention also includes apparatus for carrying out the method of the invention which comprises two distillation columns fitted with a common condenser/evaporator to provide reflux for the one column and reboil for the other column and each provided with its own heat pump cycle providing reboil and reflux therefor.

The invention is illustrated by the accompanying drawings in which:

FIG. 3 illustrates diagrammatically a specific embodiment of the invention applied to the separation of a given mixture of gases.

Figure 1:
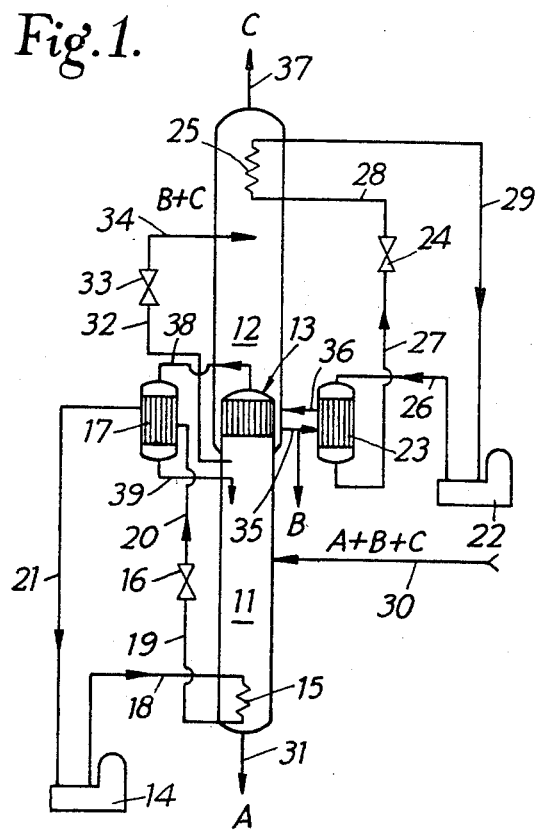
FIGS. 1 and 2 illustrate broadly and diagrammatically two different arrangements of the gas separation system according to the invention, including only these parts necessary for explanation of the operation of the system in each case.

Referring to FIGS. 1, 11 and 12 are the two columns arranged as a double column, one above the other with a common condenser/evaporator 13. Each column is provided with a closed heat pump cycle. That of the lower column 11 comprises compressor 14, reboiler 15, expansion valve 16 and reflux condenser 17, interconnected by pipe lines 18, 19, 20 and 21. That of the upper column 12 comprises compressor 22, reboiler 23, expansion valve 24 and reflux condenser 25 interconnected by pipe lines 26, 27, 28 and 29. In separating a ternary mixture of gases $A+B+C$, the lower column is operated at a higher pressure than the upper column and the feed is passed to an intermediate point of column 11 via pipe line 30. A liquid stream consisting predominantly of component A is taken off from the bottom of column 11 by pipe line 31. A mixture of B and C in gaseous form is passed from the upper end of column 11 through pipe line 32, expansion valve 33 and pipe line 34 into the upper column 12 in which it may be separated into component B as liquid and C as gas. As required, B may be withdrawn as liquid from pipe line 35 (as shown in FIG. 1) or as vapour if taken from the vapour line 36 above the liquid line. Gas C leaves the top of column 12 via line 37.

Heat passes from the lower to the upper column in condensing reflux in common condenser/evaporator 13 with the simultaneous production of reboil for the upper column. Gas leaving the top of lower column 11 by line 38 is condensed in reflux condenser 17 of the heat pump cycle of the lower column 11 and returned as reflux liquid to lower column 11 by line 39. Further liquid from the bottom of upper column 12 is circulated via line 35 through reboiler 23 of the heat pump cycle of upper column 12 returning via line 36 as gas, additional reboil for the upper column 12 being thus provided. In the lower heat pump cycle, the circulating refrigerant is compressed in compressor 14, passed by line 18 to reboiler 15 and liquefied therein in providing reboil for column 11. The liquefied refrigerant leaves reboiler 15 by line 19, is expanded through valve 16 and passed by line 20 to reflux condenser 17 in which it is evaporated, and it is then returned as gas by line 21 to the suction side of compressor 14. The heat pump cycle of the upper column 12 operates similarly.

It will be appreciated that a system such as is illustrated in FIG. 1 is flexible in that it is possible to vary the circulation through each heat pump cycle separately, whilst at the same time preserving the heat balance because of the thermal link provided between the two columns 11 and 12 by condenser/evaporator 13.

The heat pump cycles shown in FIG. 1 are closed cycles, but it has been found that these cycles can advantageously be operated as open cycles in the arrangement according to the invention utilizing as the refrigerants components separated from the feed stream in the separation process. Thus in the system shown in FIG. 1 it has been found that the component B having a boiling point between those of A and C may be used as the refrigerant for the heat pump cycle of the lower column 11 and component C may be used as the refrigerant of the heat pump cycle of the upper column 12.

Figure 2:
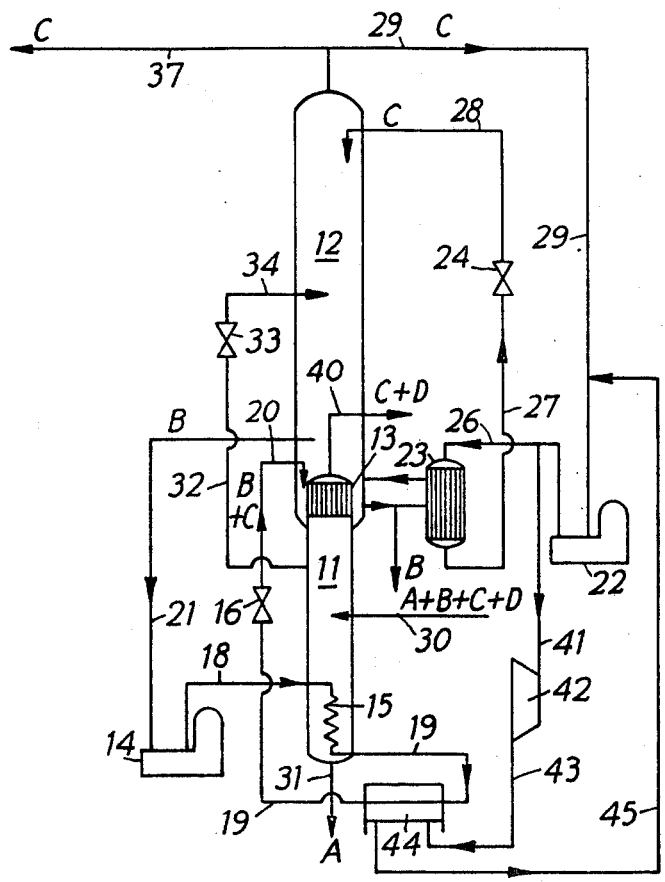

Such a modification is shown diagrammatically in FIG. 2 of the accompanying drawings, in which only those parts essential for explanation of the operation are shown, but which illustrates in addition one method of providing the refrigeration required for operation of the separation process.

Referring to FIG. 2, in which like parts are given the same reference numerals as in FIG. 1, the compressor 14 takes its suction through line 21 from pure vapour of component B near the bottom of the upper column 12, while the liquid of pure B formed in the reboiler 15 of the lower column 11 is discharged, after passing through line 19, expansion valve 16 and line 20 into the upper column 12 near the same point. The withdrawal of vapour from, and the discharge of liquid to, the base of the upper column 12 is equivalent to the removal of heat and results in the production of reflux in the lower column 11 through the transmission of heat across the surface of the reflux condenser 13. Moreover the compressor 22 of the heat pump cycle of the upper column 12 takes suction via line 29 from a part of the product stream of pure C issuing from the top of the upper column 12. The compressed vapour passed by line 26 to the evaporator/condenser 23 in which it is condensed and the condensed liquid is fed via line 27, expansion valve 24 and line 28 into the upper column 12 into which it is discharged as direct reflux.

In the arrangement shown in FIG. 2, the feed stream entering by line 30 is shown as containing a fourth component D which issues from the top of the reflux condenser 13 in admixture with component C. This is to illustrate the case in which the feed gas contains, apart from the main components A, B and C, a limited quantity of a fourth component D having a boiling point significantly lower than that of C, such as for instance hydrogen in association with light hydrocarbons. In such a case it has been found possible to take as a side stream from the lower column a liquid mixture of B and C substantially free of D, which is fed via line 32, expansion valve 33 and line 34 to an intermediate point of column 12 and a gaseous fraction consisting of C and D substantially free of component B, from the top of evaporator/condenser 13 which leaves via line 40. It is thus possible to remove component D from the mixture.

Further in FIG. 2 is shown a preferred method of producing refrigeration for the low temperature separation process here described. It will be understood that such refrigeration is required to cool down the plant and to maintain it at low temperatures against inevitable cold losses. It will also be understood that the two heat pumps themselves produce no net refrigeration since the heat withdrawn on the low-pressure side is approximately equal to, but generally slightly less, than the heat introduced on the high-pressure side by the condensation of the refrigerant.

A preferred method of refrigeration is to withdraw a portion of the component C compressed by the heat pump compressor 22 by line 41, to pass this compressed gas through an expansion turbine 42, in which it is expanded to a lower pressure with the performance of external work and in which it is cooled to a low temperature, and then to pass it by line 43 through a heat exchanger 44 in which it subcools component B, which has been condensed in the reboiler 15 of lower column 11 and thereby abstracts heat from the plant. Component C, on leaving the subcooler 44, thereupon returns to the suction side of the compressor 22, via line 45.

It will be understood that the various streams described above are aranged to exchange heat with one another in suitable heat exchangers in conventional fashion as shown in FIG. 3 described below so as to ensure an economic operation of the process. These heat exchangers have been omitted from the figures and the description for the sake of clarity. Moreover, the reboiler 15 and the condenser/evaporator 13 need not be installed inside the column as shown in the figures, but may well be sited external to the columns in the same manner as the condenser 23.

The open heat pump cycles described with reference to FIG. 2 perform essentially the same function as the closed heat pump cycles of FIG. 1 but their use has the important advantages that the reflux condensers 17 and 25 of FIG. 1 may be dispensed with and that the heat pump cycles may be operated at lower pressures, since the temperature difference otherwise required for the transfer of heat across the condenser surface is eliminated.

The separation system of the invention may suitably be applied to the separation of mixtures containing 3 or more gases such as may suitably be separated into 3 or 4 product streams in two distillation columns and particularly of mixtures of light hydrocarbons and so-called permanent gases, which may contain up to about 10% by volume of hydrogen.

It may, for example, be applied to:

(i) The separation of substantially pure argon from a mixture containing hydrogen, nitrogen, argon and methane;

(ii) The separation of substantially pure carbon monoxide from a mixture of hydrogen, nitrogen, carbon monoxide and methane;

(iii) The separation of light hydrocarbons which do not form azeotropes and which may contain hydrogen and/or helium.

The purities of the separate streams may be adjusted within wide limits to suit requirements.

The method of refrigeration or cold production by expanding a portion of the component C through an expansion turbine after it has been compressed in the compressor of the heat pump cycle of the upper column is useful in the arrangement of the invention but other known methods of cold production may be used.

Essentially, the low temperature separation system of the invention comprises two distillation columns, each having its own heat pump cycle providing reboil and reflux, and the distillation columns having a common condenser/evaporator providing reflux for the first column, into which the gaseous or partially liquid feed material is introduced, and reboil for the second column. The heat pump cycles my be closed cycles, but where suitable product streams are available, the heat pump cycles are preferable open cycles making use of two of the product streams, each taking a gaseous product stream from the system and returning it in liquefied form to the system. The liquid returned from the heat pump cycle of the first column may be returned to the bottom of the second column or the corresponding part of the common condenser/evaporator to provide reflux for the first column by indirect heat exchange.

The two columns may suitably be arranged as a double fractionating column one above the other, though this is not essential. Normally the first column (or lower column) will be operated at a higher pressure than the second (or upper) column, both columns operating at superatmospheric pressure.

One embodiment of the invention is described below by way of example, reference being made to FIG. 3 of the accompanying drawings.

Example

In this example the process of the invention is applied to the separation of a gas mixture consisting of hydrogen, nitrogen, argon and methane, the primary object being to recover substantially pure argon. A schematic flow diagram of the process is shown in FIG. 3 of the accompanying drawings.

The feed mixture at a pressure of 5 atmospheres absolute enters via line 100 and after preliminary cooling or preliminary cooling and partial condensation in heat exchanger 101, in counter-current with product streams, is fed via line 102 to the lower column 103 of the two fractioning columns 103 and 104 thermally linked together by a common condenser/evaporator 105. The liquid collecting at the bottom of column 103 consists predominantly of methane and is withdrawn via line 106. A gas containing substantially all the hydrogen is withdrawn from the top of the condenser 105 via line 107 and may be combined with the methane stream from line 106 to pass together therewith to heat exchanger 101. A side stream of argon and nitrogen is withdrawn from column 103 a few plates below the top thereof and passed via line 108, heat exchanger 109 and expansion valve 110, being expanded therein to 1.3 atm. abs., to the upper column 104, in which it is separated into substantially pure liquid argon and nitrogen vapour containing some argon. The liquid argon leaves the bottom of the column 104 via line 111 to be collected as product and may be subjected to further treatment if required. Part of the nitrogen vapour leaving the top of column 104 is passed via line 112 through heat exchangers 109 and 101, in indirect heat exchange with the lower side stream (combination of streams from lines 106 and 107) entering via line 113 and incoming gases entering via line 100, respectively.

The open heat pump cycles associated with columns 103 and 104 operate respectively as follows:

Pure argon vapour is withdrawn from the upper column 104 below its bottom tray and above the liquid surface, is passed via line 114 to heat exchanger 115 in which it is warmed to near ambient temperature and thence to compressor 116 in which it is compressed to 30 atm. abs. It is then returned through heat exchanger 115, in which it is cooled to a temperature close to its dew-point, and passed thence by line 117 to the reboiler 118 of column 103, in which it is liquefied. The liquid argon leaves reboiler 118 by line 119 and is sub-cooled in heat exchanger 120 with cold nitrogen vapour (provided as described below). The sub-cooled liquid argon leaves heat exchanger 120 via line 121, is expanded to 1.3 atm. abs. through valve 122 and then returned to the bottom of column 104 via line 123.

In the second heat pump cycle, part of the nitrogen vapour (containing some argon) is withdrawn from the top of column 104 via line 124, passed through heat exchangers 125 and 126 in which it is warmed to near ambient temperature and then fed via line 127 to compressor 128 in which it is compressed to 5.5 atms. abs. The compressed nitrogen is then returned via line 129 through heat exchanger 126 and partly via line 130 through heat exchanger 125, being cooled to a temperature close to its dew-point in the process. The cooled nitrogen leaving heat exchanger 125 passes via line 131 to a condenser/evaporator 132 in which it is liquefied in indirect heat exchange with liquid argon circulating therethrough from column 104, the liquid argon entering via line 133 and returning as vapour via line 134. The liquid nitrogen stream is then passed via line 135 to expansion valve 136, in which it is expanded to 1.3 atm. abs. and thence via line 137 into the top of column 104 as reflux.

Part of the gaseous nitrogen leaving heat exchanger 126 is passed via line 138 to expansion turbine 139, through which it is expanded with the performance of external work to 1.3 atms. abs. and thus cooled, and thence via line 140 through heat exchanger 120 to sub-cool by indirect heat exchange the liquid argon passing through this heat exchanger counter-current thereto. The nitrogen leaving heat exchanger 120 is returned to the suction side of compressor 128 via line 141, heat exchanger 126 and line 127.

All the heat exchangers operate by indirect heat exchange with a stream to be cooled passing counter-current to a heat absorbing stream.

The operating pressures of columns 103 and 104 are 5 atm. abs. and 1.3 atm. abs. respectively. For the particular gas feed and product streams obtained as set out below, the temperature in column 103 varied from 135° K. at the bottom to 93° K. at the top plate, and the temperature in column 104 varied from 90° K. at the bottom to 79.5° K. at the top.

The compositions of the feed and of the product streams leaving the columns are as follows:

| | Feed, V percent | $CH_4$ stream from bottom of column 103 via line 106, V percent | Argon product from bottom of column 104 via line 111, V percent | $N_2$ stream from top of column 104 via line 112, V percent | $H_2$ stream from top of column 103 via line 107, V percent |
|---|---|---|---|---|---|
| $H_2$ | 5.5 | | | | 17.1 |
| $N_2$ | 47.1 | 0.6 | 0.002 | 96.0 | 81.6 |
| A | 8.1 | 2.0 | 99.997 | 4.0 | 1.3 |
| $CH_4$ | 39.3 | 97.4 | 0.001 | | |

The argon product stream is the main product. The $CH_4$ and $H_2$ streams may be collected separately or may be combined as shown in FIG. 3 to provide a fuel gas mixture. The $N_2$ stream may be used as an inert gas stream where suitable for this purpose.

The system illustrated in FIG. 3 may be used to obtain a substantially pure argon product from a gaseous mixture containing carbon monoxide in addition to the gases specified in the above example. In such a case most of the carbon monoxide will be taken off with the nitrogen from the top of column 104 by line 112. Thus the system may be applied to a gaseous mixture consisting predominantly of carbon monoxide and nitrogen but also containing argon, methane and hydrogen. The conditions of operation will depend on the composition of the gas, but the application of the scheme set forth in FIG. 3 to gases of varying composition will be within the scope of the technician experienced in this field.

We claim:

1. A method for the separation of a mixture of at least three gases to produce at least three product streams by fractional distillation at below ambient temperature in at least a first and a second distillation column having a common condenser/evaporator, such that the temperature range of the fluids in the first column is above that of the fluids in the second column, and such that the fluids used in the heat pump cycle of each column do not come into physical contact with each other, comprising:

(a) passing a feed mixture to said first column, (b) taking liquid from the bottom of said first column as product, (c) passing a first vapor from the bottom of the second column through a first compressor and into heat-exchange contact with the liquid at the bottom of said first column to condense said first vapor to a first liquid, (d) passing said first liquid back to the bottom of said second column, (e) passing a second liquid from the upper portion of said first column as feed mixture to said second column, (f) taking a third vapor from the top of said second column and dividing it into fourth and fifth vapor portions, wherein the fourth vapor portion is drawn off as product, (g) passing the fifth vapor portion through a second compressor and into heat-exchange contact with the liquid at the bottom of the second column to condense said fifth vapor portion into a fifth liquid portion, (h) returning said fifth liquid portion to the top of said second column as reflux, and (i) taking liquid from the bottom of said second column as product.

2. The method of claim 1, further comprising:

(a) diverting a portion of said fifth vapor portion, after it has passed out of said second compressor, through an expansion turbine in order to cool said diverted portion, (b) passing said diverted vapor portion in heat-exchange contact with said first liquid just after said first liquid has come into heat-exchange contact with the liquid in the bottom of said first column, and (c) returning said diverted vapor portion to the inlet side of said second compressor.

3. The method of claim 1, further comprising taking vapor from the top of said first column as product.

4. Apparatus for the separation of a mixture of at least three gases by fractional distillation at temperatures below ambient temperature in two distillation columns, comprising first and second distillation columns fitted with a common condenser/evaporator enabling the transfer of heat from one column to the other column in providing reflux for the one column and reboil for the other column, a first compressor, a pipeline connected to the lower end of a second column to feed a gas stream therefrom to the suction side of the said first compressor, a pipeline for passing compressed gas from the said first compressor to the inlet of the reboiler of the said first column, a pipeline having an expansion valve therein which connects the outlet of the reboiler in said first column with the lower end of the second column, a second compressor, a pipeline connecting the top of the second column to the suction side of the second compressor, a pipeline connecting the outlet of the second compressor to the inlet of the reboiler of the second column, and a pipeline having an expansion valve therein connecting the outlet of the reboiler of the second column with the top of the second column.

5. Apparatus as claimed in claim 4, further including a heat exchanger through which passes the pipeline connecting the outlet of the reboiler of the first column with the lower part of the second column, a second pipeline connecting the outlet of the second compressor with the inlet of an expansion turbine, a third pipeline connecting the outlet of the expansion turbine with the inlet of said heat exchanger, and a fourth pipeline connecting the outlet of said heat exchanger with the inlet of said second compressor.

References Cited

UNITED STATES PATENTS

| 1,853,743 | 4/1932 | Pollitzer | 62—40 XR |
| 2,423,273 | 7/1947 | Van Nuys | 62—40 XR |
| 2,567,461 | 9/1951 | Aicher | 62—40 XR |
| 2,765,637 | 10/1956 | Etienne | 62—39 XR |
| 3,037,359 | 6/1962 | Knapp | 62—22 |
| 3,062,016 | 11/1962 | Dennis et al. | 62—22 |
| 3,181,306 | 5/1965 | Geist | 62—22 |
| 3,214,926 | 11/1965 | Shaievitz | 62—40 XR |
| 3,327,490 | 6/1967 | Grenier | 62—30 |
| 2,729,954 | 1/1956 | Etienne | 62—30 XR |

FOREIGN PATENTS

| 1,048,937 | 1/1959 | Germany. |
| 1,158,534 | 12/1963 | Germany. |

WILBUR L. BASCOMB, Jr., Primary Examiner

U.S. Cl. X.R.

62—22, 29, 30, 31, 39, 40